June 12, 1962   A. J. GALE   3,039,011
ELECTROSTATIC GENERATOR
Filed Feb. 3, 1958   4 Sheets-Sheet 1

June 12, 1962  A. J. GALE  3,039,011
ELECTROSTATIC GENERATOR
Filed Feb. 3, 1958  4 Sheets-Sheet 2
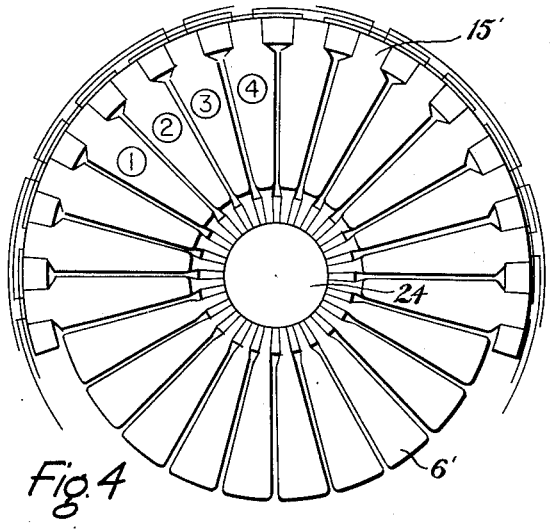
Fig. 4
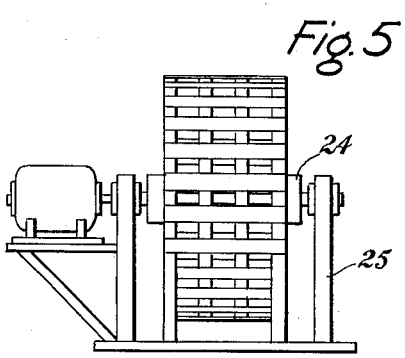
Fig. 5
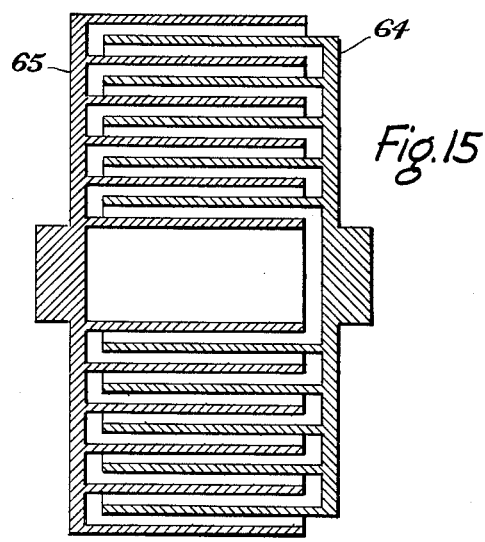
Fig. 15
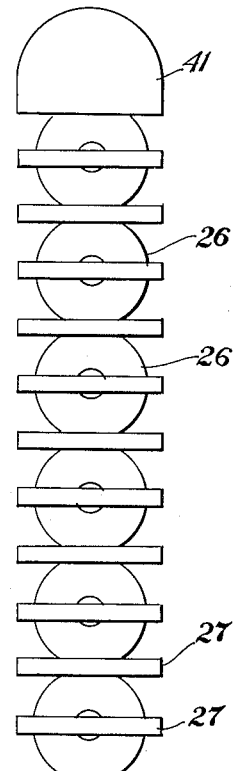
Fig. 6
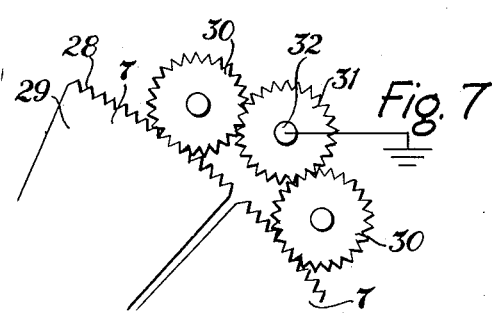
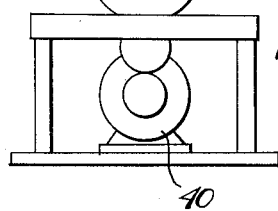
Fig. 7

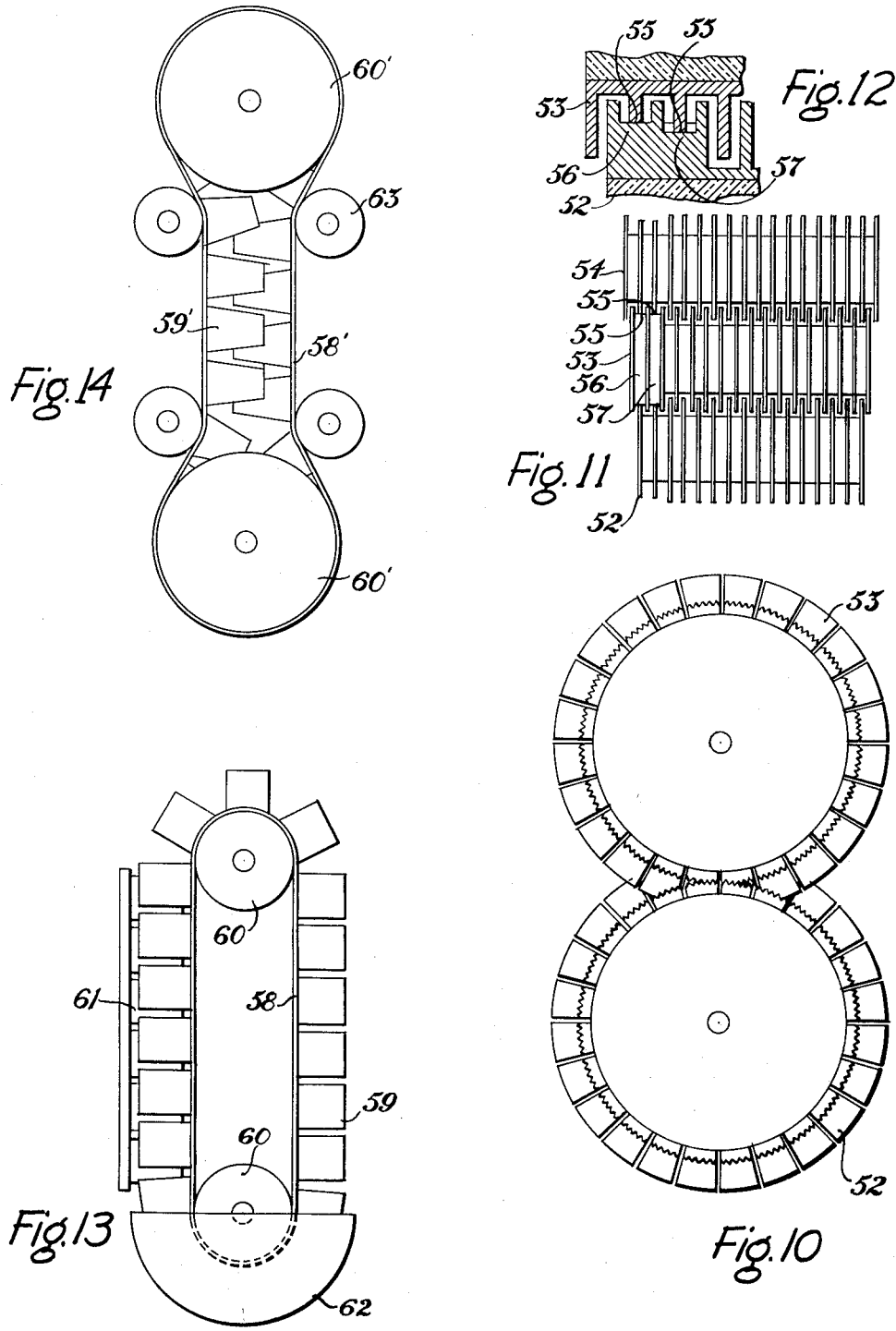

United States Patent Office
3,039,011
Patented June 12, 1962

3,039,011
ELECTROSTATIC GENERATOR
Alfred J. Gale, Lexington, Mass., assignor to High Voltage Engineering Corporation, Burlington, Mass., a corporation of Massachusetts
Filed Feb. 3, 1958, Ser. No. 713,050
5 Claims. (Cl. 310—6)

This invention relates to electrostatic generators and in particular to an improved type of generator of increased efficiency and adapted to operate either at high voltage and high power output or at lower voltage and very high current.

At the present time the electrostatic generator most commonly used is the belt-type electrostatic generator, wherein an endless belt, capable of insulating along its length, carries electric charge between ground and the interior of a hollow electrode. The losses in such a generator are due principally to windage, which is proportional to the cube of the speed of the belt and to the area of the belt surface. In accordance with the invention, an alternative structure is proposed wherein these losses are minimized by increasing the relative capacitance of the charge carrier, so that high currents are obtained with charge carriers of relatively small area and relatively low speed.

The invention includes broadly the use of various interleaving structures for increasing the relative capacitance of the charge carrier including, but not limited to, multiple disks, interleaving drums, chain-link belts and similar structures. For higher voltages any of these generators may be connected in cascade.

The invention may best be understood from the following detailed description thereof having reference to the accompanying drawings in which:

FIG. 4 is an end view, similar to that of FIG. 3, showing a modification of the apparatus of FIG. 1 which is adapted to low-voltage, high-current operation;

FIG. 5 is a front elevation, similar to that of FIG. 2, of the apparatus of FIG. 4;

FIG. 6 is a somewhat diagrammatic view in side elevation showing a series of electrostatic generators, of the type shown in FIG. 1, connected in cascade.

FIG. 7 is a detail showing the charge-transfer mechanism of the apparatus of FIG. 1;

FIG. 10 is a detail showing a peripheral-drive mechanism suitable for transmitting mechanical power from unit to unit in the cascade arrangement of FIG. 6, and also for serving as a charge-transfer mechanism;

FIG. 11 is a detail showing a charge-transfer mechanism, of the type shown in FIG. 10; for the apparatus of FIG. 6;

FIG. 12 is a detail showing a portion of the charge-transfer mechanism of FIG. 11;

FIG. 15 is a vertical central section of a drum-type electrostatic generator constructed in accordance with the invention;

FIG. 13 is a diagrammatic view in side elevation, partly broken away, of a chain-link belt type of electrostatic generator constructed in accordance with the invention; and FIG. 14 is a diagrammatic view in side elevation, partly broken away, of a modified embodiment of the apparatus shown in FIG. 13.

Figure 1:
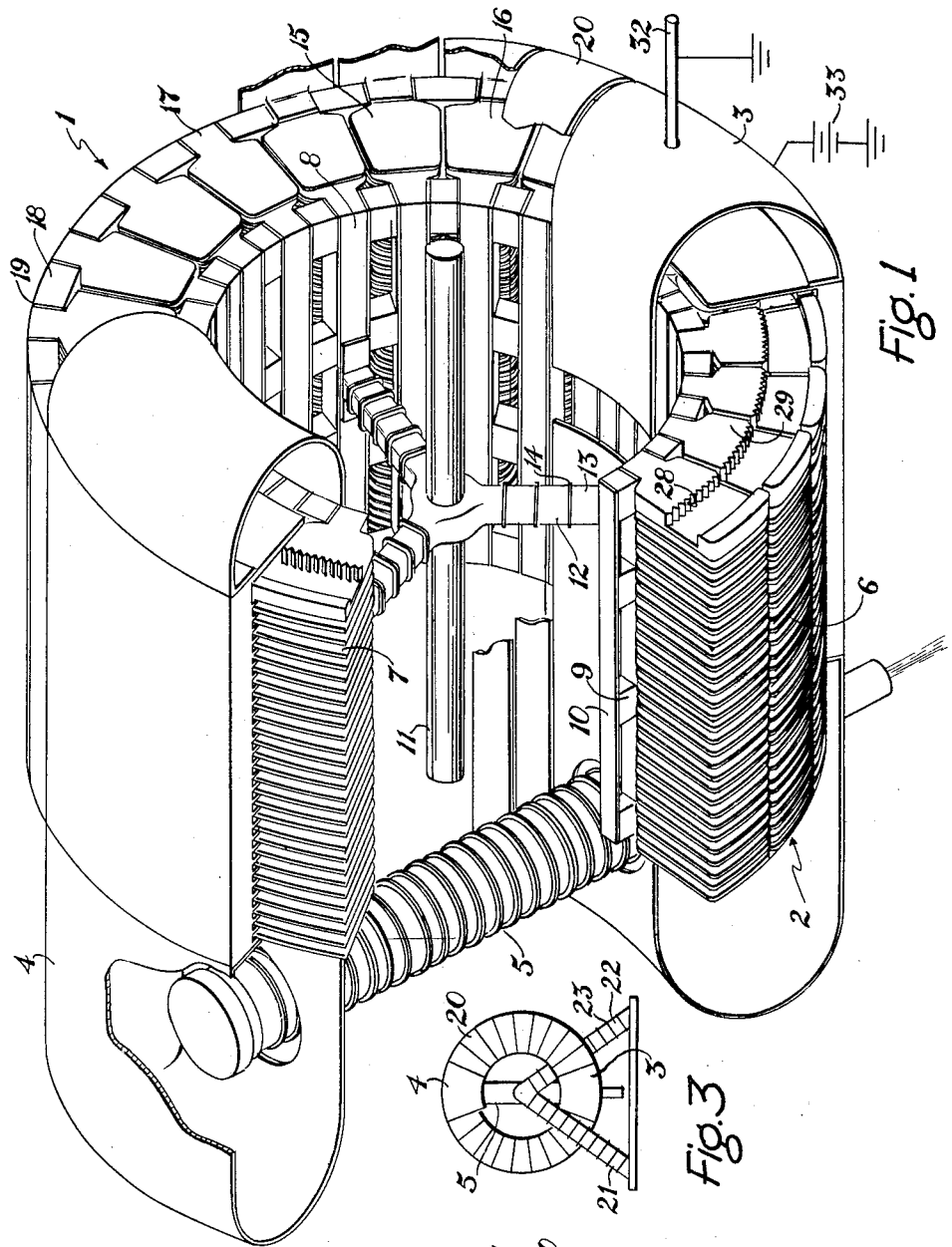
FIG. 1 is a perspective view, partly broken away, of a multiple-disk electrostatic generator constructed in accordance with the invention.
Figure 3:
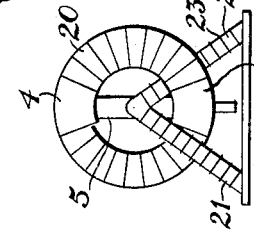
FIG. 3 is an end view, partly broken away, of the apparatus of FIG. 1.
Figure 2:
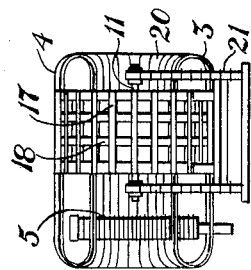
FIG. 2 is a front elevation, partly broken away, of the apparatus of FIG. 1.

Referring to the drawings and first to FIGS. 1, 2 and 3 thereof, the electrostatic generator of the invention comprises essentially two parts: a stator 1 and a rotor 2. The stator 1 includes a grounded terminal 3 and a high-voltage terminal 4 between which may be connected a suitable load, such as an acceleration tube 5. The rotor 2 includes a series of comblike rotor units 6, each of which comprises a plurality of rotor blades 7, of conductive material, affixed to a support bar 8 of conductive material. If desired, each rotor unit 6 may be cut from a single piece of metal. Adjacent rotor units 6 are connected to one another by insulating members 9 which may be cemented to conductive strips 10 which, in turn, are bolted to the support bars 8 of the rotor units 6. The lateral surfaces of the support bars 8 are beveled somewhat, so that the entire assembly of rotor units 6 forms a tubular structure which is supported upon a shaft 11 by spokes 12 which are formed of alternating insulators 13 and conductive members 14 so as to insulate the high voltage between the high-voltage terminal 4 and the shaft 11 and that between the shaft 11 and the grounded terminal 3. The stator 1, in addition to the main terminals 3 and 4, also includes a series of comb-like stator units 15, each of which comprises a plurality of stator blades 16, of conductive material, affixed to a support bar 17 of conductive material. The stator blades 16 are shaped substantially identically to the rotor blades 7, but they are supported at the outer periphery of the stator 1 by the support bars 17, while the rotor blades 7 are supported at the inner periphery of the rotor 2. Each stator unit 15 is therefore similar to each rotor unit 6, except that the stator unit 15 has one more stator blade 16 than the rotor unit 6 has rotor blades 7. Accordingly, during its movement between the two main terminals 3 and 4, each rotor blade 7 is always flanked by two stator blades 16, which serve to increase the relative capacitance of the rotor blade 7 throughout its travel between terminals. If desired, each stator unit 15 may be cut from a single piece of metal. Adjacent stator units 15 are connected to one another by insulating members 18 which may be cemented to conductive strips 19 which, in turn, are bolted to the support bars 17 of the stator units 15. The lateral surfaces of the support bars 17 are beveled somewhat, so that the entire assembly of stator units 15 forms a tubular structure. Each stator unit 15 terminates at its extremities in a rounded member 20 of conductive material which is shaped to correspond to the contour of the main terminals 3, 4.

Electric charge is conveyed between the grounded terminal 3 and the high-voltage terminal 4 by the rotor blades 7. As will be described in detail hereinafter, electric charge is deposited on the rotor blades 7 by induction charging, and is removed from the rotor blades 7 in the same way.

In order to simplify the high-voltage insulation problem, the shaft 11 may be supported upon legs 21, which are formed of alternating insulators 22 and conductors 23, and may be maintained at half the voltage of the high-voltage terminal 4 by a suitable voltage divider (not shown). The rotor 2 is then driven at the grounded end of the apparatus by a suitable peripheral drive, to be described in detail hereinafter, which may also serve as the charge-transfer mechanism. A similar mechanism may be used within the high-voltage terminal 4 to serve not only as the charge-transfer mechanism but also as a source of power within the high-voltage terminal 4; such a source may be required for various purposes, such as heating the cathode filament of the acceleration tube 5.

Referring now to FIGS. 4 and 5, the device therein shown is a modification of the apparatus of FIG. 1 which is adapted to produce very high currents at relatively low voltages. In transforming the apparatus of FIG. 1 into that of FIGS. 4 and 5 the number of main terminals is increased from two to eight, the lower voltage permits the diameter of the device to be decreased, and the three spokes 12 of the rotor 2 are eliminated by the use of a single insulating shaft 24. Because of the lower voltage, the insulating shaft 24 may be supported upon grounded supports 25, an axial drive may be employed, and charge transfer may be effected near the axis of the device in lieu of the peripheral arrangement of the apparatus of FIG. 1. Referring now to FIG. 6, therein is shown a series of electrostatic generators 26 connected in cascade in order to multiply the voltage obtainable from a single generator. Each generator may be of the type shown in FIG. 1, with the high-voltage terminal 27 of each generator except the uppermost one serving also as the "grounded" terminal of the next succeeding generator.

The charge-transfer mechanism which is employed to transfer electric charge between the rotor and the stator at the various main terminals will, of course, vary according to specific requirements. Some preferred charge-transfer mechanisms will now be described.

In the apparatus shown in FIGS. 1–3, the gear mechanism shown in FIG. 7 may be employed not only as the charge-transfer mechanism but also as the mechanical drive. At least one of the rotor blades 7 of each rotor unit 6 is somewhat thickened and is provided with a serrated edge 28, as shown in FIGS. 1 and 7, so as to form, in effect, a gear wheel 29. However, because of the gaps between adjacent rotor blades 7, the gear wheel 29 must be driven by at least two driving wheels 30 which are so spaced that at least one driving wheel 30 always engages the gear wheel 29. As shown in FIG. 7, two driving wheels 30 may be driven by a third wheel 31 which is connected by a shaft 32 to a suitable motor (not shown).

In order that the gear mechanism may serve as a charge transfer mechanism, it is merely necessary that a suitable voltage, of the order of several kilovolts, be applied between the grounded terminal 3 and the driving wheels 30. Thus, for example, a voltage source 33 may be used to apply a potential of several kilovolts to the grounded terminal 3—the driving wheels 30, the shaft 32, and the motor being grounded. In this event, of course, the "grounded" terminal 3 is not actually grounded, but is referred to as such merely in contradistinction to the "high-voltage" terminal 4.

As hereinbefore stated, a gear mechanism such as that shown in FIG. 7 is also employed within the high-voltage terminal 4. This second gear mechanism is connected to the high-voltage terminal 4 and serves not only to collect electric charge from the rotor 2 but also to provide a source of mechanical power. For example, wheels identical to the two driving wheels 30 of FIG. 7 may be mounted in suitable bearings which are electrically connected to the high-voltage terminal 4, while a wheel identical to the third wheel 31 is connected to a suitable alternator by a shaft similar to the shaft 32.

Figure 8:
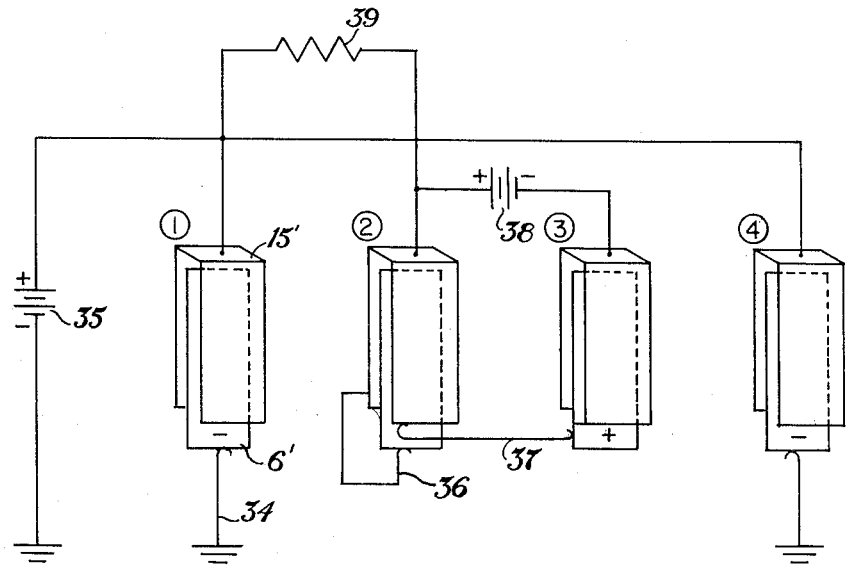
FIG. 8 is a diagram showing the charge-transfer mechanism of the apparatus of FIG. 4.

In the apparatus shown in FIGS. 4–5, the peripheral drive is replaced by an axial drive, so that the gear mechanism of FIG. 7 is not so attractive, although it may be employed. Because of the lower voltages, it is simpler to use brushes mounted near the axis of the device. Referring now to FIGS. 4 and 8, every third stator unit 15' is connected together, so that the device in effect comprises eight generators connected in parallel, each generator including four stator units 15', two of which are shared with adjacent generators. Referring to the circuit diagram of FIG. 8, as a rotor unit 6' enters stator unit No. 1, it is grounded by means of the brush 34. Stator unit No. 1 is maintained at a positive potential with respect to ground by a suitable voltage source 35 which may be, for example, of the order of 10 kilovolts. As the rotor unit 6' enters stator unit No. 1, the positive charge on stator unit No. 1 induces a negative charge on the rotor unit. Before the rotor unit leaves the vicinity of stator unit No. 1, the brush connection to ground is broken and the negative charge on the rotor unit is carried thereby to the inside of stator unit No. 2, where the rotor unit is connected to stator unit No. 2 by another brush 36, thereby discharging the rotor unit. The now uncharged rotor unit proceeds towards stator unit No. 3 and, before entering the same, it is still connected to stator unit No. 2. Its connection with stator unit No. 2 is maintained by means of a brush connection 37. Stator unit No. 3 is maintained at a negative potential with respect to stator unit No. 2 by means of a second voltage source 38 providing a potential which may be of the order of 10 kilovolts. As a result, as the rotor unit enters stator unit No. 3, a positive charge is induced thereon which the rotor unit then carries into stator unit No. 4, at which time the rotor unit is again connected to ground, so that the positive charge thereon flows to ground and a negative charge is induced thereon as hereinbefore described. It will be observed that although at the high-voltage terminal two stator units (Nos. 2 and 3) are required, one (No. 2) to remove the charge brought thither and another (No. 3) to deposit charge of opposite polarity, a single stator unit (No. 1 or No. 4) suffices at the grounded terminal, owing to the fact that the generator surroundings are at ground potential. If the load 39 is connected as shown in the circuit diagram, it will be observed that the load current does not flow through the voltage sources 35 and 38. However, if, for example, the load 39 were connected between stator unit No. 3 and ground, the load current would travel through both voltage sources 35 and 38.

In the cascaded device shown in FIG. 6 the gear drive shown in FIG. 1 may be used so that the motor 40 drives the entire stack by connection of peripheral drive to peripheral drive. If it is not desired to charge the down run, the charge transfer may be effected merely by having each succeeding rotor provided with an additional disk to surround the previous rotor. If, however, down-run charging is desired, auxiliary voltage sources may be used as hereinbefore described. In the alternative, the circuit shown in FIG. 9 may be used to effect the charge transfer without the use of separate voltage sources.

Figure 9:
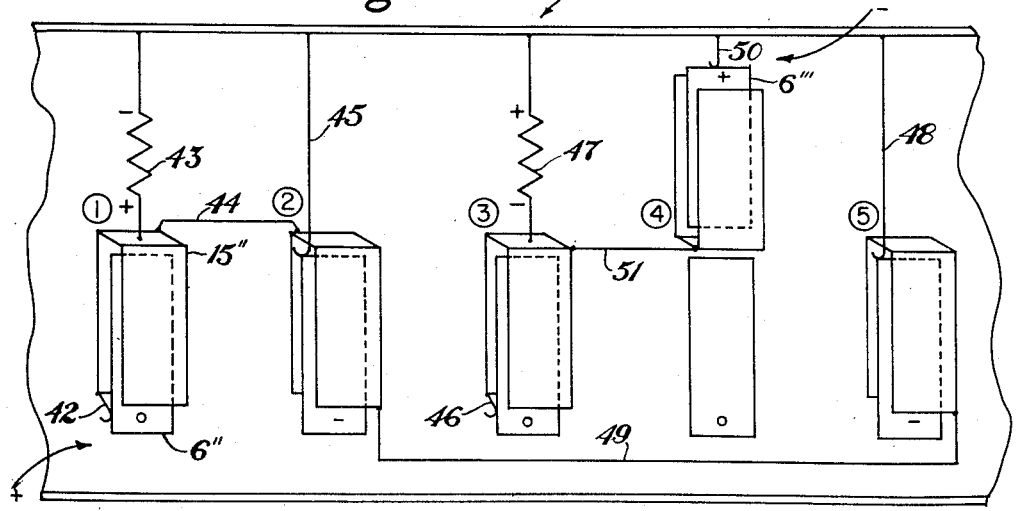
FIG. 9 is a diagram showing one possible charge-transfer mechanism for the apparatus of FIG. 6.

Referring now to FIG. 9 therein is shown in diagrammatic form the interior of an intermediate terminal 27 of the cascade apparatus shown in FIG. 6. The charge-transfer mechanism includes five stator units 15" of which four (Nos. 1, 2, 3 and 5) are so placed as to interleave with the lower rotor units 6" and one (No. 4) is so placed as to interleave with the upper rotor units 6'''. Assuming for the sake of simplicity that the cascade generator of FIG. 6 is adapted to generate a positive potential at its high voltage terminal 41, each lower rotor unit 6" will be positively charged as it enters an intermediate terminal 27. When it enters stator unit No. 1, it is discharged by means of the brush 42. The positive charge then flows through a first resistor 43 thereby establishing a positive potential upon stator unit No. 1 with respect to the intermediate terminal, which constitutes the local ground. This positive potential is also applied to stator unit No. 2 by means of the lead 44. As the rotor unit enters stator unit No. 2, it is connected to terminal ground by means of the brush 45 so that negative charge is induced on the rotor unit by virtue of the positive charge on stator unit No. 2. The rotor unit is now negatively charged, and as it enters stator unit No. 3, it is discharged by means of a brush 46 so that the negative charge flows through a second resistor 47 thereby establishing a negative potential on stator unit No. 3 with respect to terminal ground. The rotor unit is now discharged, and as it enters stator unit No. 5, it is connected to terminal ground by means of the brush 48. Stator unit No. 5 is connected directly to stator units Nos. 1 and 2 by means of a lead 49 so that it has a positive potential with respect to the terminal ground. As a result negative charge is induced on the rotor unit, which negative charge then carries away from the intermediate terminal.

Meanwhile, as each upper rotor unit 6''' enters stator unit No. 4, it is connected to terminal ground by a brush 50. Stator unit No. 4 is connected to stator unit No. 3 by a lead 51 and is therefore at a negative potential with respect to the terminal ground. As a result, positive charge is induced on the upper rotor unit, which positive charge it then carries away from the intermediate terminal. As the upper rotor unit enters stator unit No. 4, it is, of course, negatively charged. The upper rotor unit is discharged upon contact with the brush 50, so that this negative charge is delivered to the terminal ground.

It will thus be observed that, assuming equivalence of the charge-carrying capabilities of each rotor unit 6'', 6''', and the equivalence of the charge-transfer capabilities of each stator unit 15'' in the intermediate terminal 27, the currents to and from the intermediate terminal 27 will cancel out. The positive current delivered to stator unit No. 1 plus the negative current taken away from stator unit No. 5 represent two positive units of current delivered to the intermediate terminal. The positive current taken away from stator unit No. 4 plus the negative current delivered thereto represent two positive units of current delivered from the intermediate terminal 27. The positive current flowing through the first resistor 43 from stator unit No. 1 and the negative current flowing through the second resistor 47 from stator unit No. 3 represent the means by which the current delivered to stator units Nos. 1 and 3 respectively are delivered to the intermediate terminal 27.

As hereinbefore noted, the gear mechanism shown in FIGS. 1 and 7 may be used to apply mechanical power to the lowest generator 26 in the cascade arrangement of FIG. 6. The mechanical power may then be transmitted from the lowest generator to the next-to-lowest generator, and so on up the stack to the uppermost generator, by interconnecting peripheral drives. Such an interconnecting gear arrangement is shown in FIG. 10 and can also be used as the charge-transfer means. The transfer of charge at the grounded end and at the high voltage terminal 41 by means of the gear mechanism shown in FIGS. 1 and 7 has already been described in connection with the device of FIG. 1. The charge-transfer mechanism between adjacent electrostatic generators 26 is shown in FIGS. 10, 11 and 12. Referring thereto, the charge deposited on the lower rotor 52 is transferred to the upper rotor 53, but the simple arrangement shown in FIGS. 10, 11 and 12 does not include means for transferring charge of the opposite sign from the upper rotor 53 to the lower rotor 52. As shown in FIG. 11, adjacent rotors 52, 53, 54 interleave, and each rotor unit of the upper rotor (53 or 54) has one more rotor blade then each rotor unit of the lower rotor (52 or 53, respectively). In this way the upper rotor (53 or 54) acts as a Faraday cage with respect to the lower rotor (52 or 53, respectively) and therefore is the charge collector, while the lower rotor is the charge donor. As in the case of the gear mechanism shown in FIGS. 1 and 7 the actual charge transfer need not involve all of the rotor blades of each unit, and in FIG. 11 only the left-hand blades are shown as being involved. The charge transfer is effected merely by contact within the Faraday cage between the lower rotor and the upper rotor and may conveniently occur at the point 55 where the gear edges are in contact. In order to provide continuous mechanical drive and continuous charge transfer, at least two tiers of rotor blades should be provided with gear mechanisms, shown at 56 and 57 in FIGS. 11 and 12, and the gaps between rotor blades of the outer tier 56 should be azimuthially displaced with respect to the gaps between rotor blades of the inner tier 57.

Various alternative structures may be conceived of without departing from the spirit and scope of the invention. For example, in FIG. 13 the rotor comprises a chain-link belt comprising two chains 58 between which there are supported transversely rotor units 59 of the general type shown in FIG. 1. The two chains 59 are supported upon two pulleys 60. As the chains 59 travel about the pulleys 60, the rotor units 59 interleave with stator units 61 constructed similarly to the stator units shown in FIG. 1, except, of course, that the stator units 61 of FIG. 13 are arranged in two rectilinear arrays between the main terminals 62.

By arranging the rotor units so that the rotor blades face inwardly rather than outwardly, it is possible to dispense with the stator units entirely and the increase in relative capacitance of the rotor blades or charge carriers is achieved by having the up-run interleave with the down-run. Such an arrangement is shown in FIG. 14. Referring thereto, the pulleys 60' are supported in cantilever so as to leave space between them for passage of the rotor blades 59'. The upward-traveling blades are caused to interleave with the downward-traveling blades by means of auxiliary pulleys 63. Charge-transfer mechanisms similar to those hereinbefore described may be used with the apparatus shown in FIGS. 13 and 14.

Still another modification of the invention is illustrated in FIG. 15. Referring thereto, the rotor comprises a drum 64 of which each rotor unit comprises a comb-like sector. It will be apparent that the rotor blades of each rotor unit are not of the same size but increase with increasing distance from the axis. The stator comprises another drum 65 which interleaves with the rotor drum 64. Each stator unit has an additional blade so that the outer series of stator blades encloses the rotor drum 64. The stator drum 65 may be stationary or, if desired, may rotate in the opposite sense from that in which the rotor drum 64 rotates.

While the invention may be used for many purposes, including those for which other types of electrostatic generators are now employed, the invention is particularly well suited for use as the source of electrical power for ion acceleration in ion propulsion devices, which have been proposed for the propulsion of vehicles in outer space. The high vacuum existing in outer space permits the electrostatic generator of the invention to operate at very high currents, thereby giving a favorable power/mass ratio. For example, the electrostatic generator of the invention could achieve two kilowatts per pound or better, while the conventional electromagnetic device can achieve only two pounds per kilowatt.

Propulsion systems involving ion thrust require the provision of electric power, the product of the acceleration potential and the rate of flow of charge in the ion stream. Electrical power is not directly available in space and must, therefore, be obtained by the conversion of some other form of energy. Conversion from chemical energy is clearly uneconomic. Solar radiant energy can, in principle, be converted quite simply by the use of photovoltaic cells for which relatively high efficiencies (10% has been achieved and the theoretical upper limit is probably about 20%) can be claimed but the constructional techniques involved—particularly since high power weight ratios are required, do not readily lead to a package which is convenient for launching into an orbit by chemical rockets. The same criticism applies to solar furnaces. On the other hand, an unshielded or only moderately shielded nuclear reactor could be programmed to go critical when it reached a stable orbit and its power used there for propulsion. Direct conversion of the heat developed in a nuclear reactor to electric energy still appears to be less efficient than the use of intermediate stages involving heat exchangers and rotating electrical machinery. An efficient ion propulsion system deriving its power from a nuclear reactor, therefore, involves electric generators which may, in principle, be either electromagnetic or electrostatic.

A high efficiency electrostatic generator intended for use in pressurized gas insulation but also adaptable for vacuum use is shown in FIG. 1. It is a multiplate disc assembly whose insulated sectors rotate between the sectors of a multiplate stator. This schematic design shows a unit which is intended to be operated at moderately high currents (about 10 milliamperes) in pressurized gas insulation. Since high efficiency is required, a low peripheral speed is selected—about 1330 feet per minute (22 feet per second). Each sector is six inches in radial depth and there are 30 plates in the disc. At 100,000 volts/cm. field strength the current carried from ground to the high voltage terminal will be a little in excess of 5 milliamperes. An equal charge of opposite polarity can be carried from the high voltage terminal to ground. The inside diameter of the disc and the general construction are determined for a total potential in excess of one million volts so that this design represents a 2-pole, 10-kilowatt, electrostatic generator.

The rotor sectors are charged by connecting them to ground through the drive shaft as they pass through a set of stator sectors field at a potential above ground. If the clearance between rotor and stator sectors is one millimeter and the potential applied to the stator sectors is 10,000 volts, then the required field of 100,000 volts per centimeter is obtained. Note that the excitation field requires only a potential. No current flows in this excitation circuit and, therefore, no energy is required.

For ion propulsion where somewhat lower potentials are required, it appears preferable to use a multipole design such as the arrangement shown in FIGURES 4 and 5. In principle we could use a 20-pole design and obtain 100 milliamperes at 100,000 volts for the same peripheral speed and excitation field strength as the previous example. In practice, because operation will be in a high vacuum, the peripheral speed can be increased several times while the diameter of the assembly is simultaneously reduced because of the lower total voltage requirement. This smaller diameter would make a 20-pole machine somewhat clumsy and an eight-pole arrangement would be more satisfactory. At 10,000 r.p.m. the current delivered from this generator would theoretically be about 1 ampere if the excitation field strength were set at 200,000 volt per centimeter. This device would be about 15 inches diameter and 10 inches thick and would deliver about 100 kilowatts. Since only surfaces are important in the charge transfer all the sectors can be fabricated from thin wall high tensile material and 20 lbs. to 40 lbs. seems a reasonable estimate for the weight. Thus if we use the power available to accelerate cesium ions, the mass thrust ratio due to the generator alone would be about 1500. A proportionately larger unit about 8 feet long and 15 inches diameter would generate 1 megawatt of electric power.

It has already been shown that there are no losses corresponding to iron losses in the electrostatic machine since the field is stored in the vacuum. Corresponding to the copper losses of the electromagnetic machine there will be the ohmic losses involved in transferring the charge on and off the sectors. Since the sector resistance will be a fraction of an ohm, the sector loss will be negligible and very high efficiencies indeed can be obtained. This is of obvious importance when the losses can only be removed in the form of radiation.

Having thus described the principles of the invention together with several illustrative embodiments thereof, it is to be understood that although specific terms are employed, they are used in a generic and descriptive sense and not for purposes of limitation, the scope of the invention being set forth in the following claims.

I claim:

1. A high-voltage electrostatic generator comprising in combination a first and a second main terminal, each comprising a Faraday cage, a tubular rotor having a multiplicity of azimuthially insulated but laterally connected conductive rotor blades arranged on its outer periphery, each blade lying in a plane perpendicular to the axis of said rotor, means for supporting said rotor between said main terminals in such a manner that upon rotation of said rotor said rotor blades travel in a closed path between said main terminals, means within said first main terminal for transferring electric charge from said first main terminal to the rotor blades of said rotor, means within said second main terminal for transferring electric charge from the rotor blades of said rotor to said second main terminal, a tubular stator including said main terminals and having a multiplicity of azimuthially insulated but laterally connected conductive stator blades arranged on its inner periphery between said main terminals in such a manner as to interleave with the rotor blades, and means for rotating said rotor, wherein said rotor is supported by a shaft which is insulated from said main terminals and wherein said rotor is driven by a peripheral drive within one of said main terminals, which peripheral drive also serves as the electrical connection through which electric charge is transferred between the rotor blades and said main terminal.

2. A high-voltage electrostatic generator comprising a series of generator units connected in cascade, each generator unit comprising in combination at least a first and a second main terminal, each comprising a Faraday cage, a charge carrier comprising a first series of mutually insulated conductors adapted to travel in a closed path between said main terminals, means within said first main terminal for transferring electric charge from said first main terminal to said charge carrier, means within said second main terminal for transferring electric charge from said charge carrier to said second main terminal, each of said conductors having an extended surface per unit length of said closed path, a second series of mutually insulated conductors placed between said main terminals along said closed path, each conductor in said second series having an extended surface per unit length of said closed path, the surfaces of the conductors in each series being adapted to interleave with the surfaces of the conductors in the other series, and means for imparting traveling movement to said charge carrier along said closed path, the first main terminal of each generator unit being integral with the second main terminal of an adjacent generator unit, wherein adjacent charge carriers are mechanically connected at their periphery so that traveling movement imparted to one charge carrier along its closed path is transferred to the other charge carriers so as to impart traveling movement thereto along their respective closed paths.

3. A high-voltage electrostatic generator comprising in combination a series of tubular rotors each having a multiplicity of azimuthially insulated but laterally connected conductive rotor blades on its outer periphery, each blade laying in a plane perpendicular to the axis of said rotor, means for supporting said rotors in cascade with their axes parallel in such a manner that the rotor blades of each rotor interleave with the rotor blades of the next adjacent rotor, each succeeding rotor having additional rotor blades so that at the area of interleaving the succeeding rotor encloses and acts as a Faraday cage with respect to the preceding rotor, means for rotating the first rotor, and gear means for mechanically connecting adjacent rotors near their periphery and also for electrically connecting the same at the area of interleaving, whereby charge is transferred from each preceding to each succeeding rotor, means for depositing electric charge onto the rotor blades of the first rotor, and means for removing electric charge from the rotor blades of the last rotor.

4. A high-voltage electrostatic generator comprising a series of generator units connected in cascade, each generator unit comprising in combination at least a first and a second main terminal, each comprising a Faraday cage, a charge carrier comprising a first series of mutually insulated conductors adapted to travel in a closed path between said main terminals, means within said first main terminal for transferring electric charge from said first main terminal to said charge carrier, means within said second main terminal for transferring electric charge from said charge carrier to said second main terminal, each of said conductors having an extended surface per unit length of said closed path, a second series of mutually insulated conductors placed between said main terminals along said closed path, each conductor in said second series having an extended surface per unit length of said closed path, the surfaces of the conductors in each series being adapted to interleave with the surfaces of the conductors in the other series, and means for imparting traveling movements to said charge carrier along said closed path, the first main terminal of each generator unit being integral with the second main terminal of an adjacent generator unit, wherein the charge-transfer means within the integral main terminals shared by adjacent generator units comprises: a first Faraday cage connected to said terminal through a first resistance, a second Faraday cage connected to said first Faraday cage, a third Faraday cage connected to said terminal through a second resistance, a fourth Faraday cage connected to said third Faraday cage, and a fifth Faraday cage connected to said first and second Faraday cages, said first, second, third and fifth Faraday cages being so positioned that the rotor blades of one rotor travel therethrough in succession, said fourth Faraday cage being so positioned that the rotor blades of the other rotor travel therethrough, means for temporarily connecting the rotor blades of said one rotor to said first Faraday cage while within it, means for temporarily connecting the rotor blades of said one rotor to said terminal while within said second Faraday cage, means for temporarily connecting the rotor blades of said one rotor to said third Faraday cage while within it, means for temporarily connecting the rotor blades of said one rotor to said terminal while within said Faraday cage, and means for temporarily connecting the rotor blades of said other rotor to said terminal while within said fourth Faraday cage.

5. An electrostatic generator comprising in combination at least a first and a second main terminal, each comprising a Faraday cage, a charge carrier comprising a chain-link belt having two chains between which are supported transversely a series of mutually insulated conductors adapted to travel in a closed path between said main terminals, means within said first main terminal for transferring electric charge from said first main terminal to said charge carrier, means within said second main terminal for transferring electric charge from said charge carrier to said second main terminal, each of said conductors having an extended surface per unit length of said closed path, the surfaces of the conductors traveling from the first to the second main terminal being adapted to interleave with the surfaces of the conductors traveling from the second to the first main terminal, and means for imparting traveling movement to said charge carrier along said closed path.

References Cited in the file of this patent
UNITED STATES PATENTS

| | | |
|---|---|---|
| 883,846 | Wommelsdorf | Apr. 7, 1908 |
| 1,435,210 | Chubb | Nov. 14, 1922 |
| 2,519,554 | Felici | Aug. 22, 1950 |
| 2,542,494 | Felici | Feb. 20, 1951 |
| 2,675,516 | Felici | Apr. 13, 1954 |

FOREIGN PATENTS

| | | |
|---|---|---|
| 429,494 | Great Britain | May 30, 1935 |
| 1,005,662 | France | Dec. 26, 1951 |